(12) United States Patent
Colomb et al.

(10) Patent No.: US 8,945,474 B2
(45) Date of Patent: Feb. 3, 2015

(54) FLUIDIZED BED REACTOR HEATER

(71) Applicants: Mitsubishi Polycrystalline Silicon America Corporation (MIPSA), Theodore, AL (US); Mitsubishi Materials Corporation, Tokyo (JP)

(72) Inventors: Matthias Colomb, Theodore, AL (US); Rick Deckbar, Theodore, AL (US); Wesley Teichmiller, Theodore, AL (US); Bryan Nettles, Theodore, AL (US)

(73) Assignees: Mitsubishi Polycrystaline Silicon America Corporation (MIPSA), Theodore, AL (US); Mitsubishi Materials Corporation, Tokyo (JP)

( * ) Notice: Subject to any disclaimer, the term of this patent is extended or adjusted under 35 U.S.C. 154(b) by 0 days.

(21) Appl. No.: 13/841,814

(22) Filed: Mar. 15, 2013

(65) Prior Publication Data

US 2014/0271380 A1 Sep. 18, 2014

(51) Int. Cl.
*B01J 8/18* (2006.01)
*B01J 19/08* (2006.01)
*B01J 12/00* (2006.01)

(52) U.S. Cl.
CPC ................. *B01J 8/1836* (2013.01)
USPC .................. 422/145; 392/309; 392/338

(58) Field of Classification Search
USPC ................... 422/145; 392/309, 338
See application file for complete search history.

(56) References Cited

U.S. PATENT DOCUMENTS

| | | | | |
|---|---|---|---|---|
| 2,807,702 | A * | 9/1957 | Gomez ......................... | 392/318 |
| 2002/0190051 | A1 * | 12/2002 | Wang et al. .................... | 219/390 |
| 2005/0279457 | A1 * | 12/2005 | Matsudo et al. ......... | 156/345.47 |
| 2010/0111804 | A1 * | 5/2010 | Lord ............................ | 423/342 |

\* cited by examiner

*Primary Examiner* — Walter D Griffin
*Assistant Examiner* — Huy-Tram Nguyen
(74) *Attorney, Agent, or Firm* — Edwards Wildman Palmer LLP

(57) ABSTRACT

This invention is a heater used to heat the feed process gas from 450° C. to greater than about 600° C. for the fluidized bed reactor (FBR) used for conversion of silicon tetrachloride (STC) to trichlorosilane (TCS). The invention involves stacked heater element carbon plates. The design of the plates allow the plates to act as baffles which improve heat transfer to the feed gas. Also, the heat gradients across each plate is calculated to be approximately 100° C. which is much lower than the gradient seen by conventional vertical heater elements. The design of the present invention prevents electrical grounding. In the design, the elements are surrounded by graphite wrapped in carbon felt to prevent heat loss by radiation and conduction.

16 Claims, 16 Drawing Sheets

Heater Element Stack

Heater Element Stack

Heater Element Ceramic Short Sleeve

Heater Element Ceramic Sleeve

Heater Element Carbon Space Type #1

PLAN VIEW

6A

ELEVATION

6B

Heater Element Carbon Space Type #1

Heater Element Carbon Space Type #2

Heater Element Carbon Rod

9

Heater Element Carbon Nut

Inlet Plenum Center Top / Bottom Insulation

Heater Element Insulation

Upper Carbon Insulation Perforated Plate A

Upper Carbon Insulation Perforated Plate B

FLUIDIZED BED REACTOR HEATER

BACKGROUND OF THE INVENTION

1. Field of the Invention

The present invention relates to an apparatus and method for producing trichlorosilane in which metallurgical grade silicon powder is reacted with hydrogen gas and silicon tetrachloride gas (STC) while being fluidized by the hydrogen gas and STC, thereby producing trichlorosilane.

2. Description of Related Art

Trichlorosilane ($SiHCl_3$) used as a raw material for producing high purity silicon may be produced by reacting metallurgical grade silicon powder (Si) of about 98% purity with STC and hydrogen gas.

The apparatus for producing trichlorosilane includes a reactor, a raw material supply device for supplying metallurgical grade silicon powder to the reactor, and a gas introduction device for introducing hydrogen gas and STC with which metallurgical grade silicon powder is reacted. In the apparatus, the metallurgical grade silicon powder inside the reactor is reacted with hydrogen gas and STC while being fluidized with the hydrogen gas and STC, and the generated gas containing trichlorosilane is discharged from the upper part of the reactor. Conventionally, a heat transfer tube extending vertically in the reactor through which a process gas is heated in a tortuous path is provided inside the reactor. Such heat transfer tube is heated externally by vertical carbon heating elements. The heat transferred to the process gas travels though the vertical tube and is therefore indirectly heated. The heat transfer tube is difficult to scale as increases in size place greater stress on the carbon parts of the tortuous path.

However the typical vertical tube heater design has a limited contact surface for heat transfer and as a result must have a different heating profile in order to achieve desired reaction temperature inside the reactor. Heat loss due to indirect heating and a limited contact surface for heat transfer can be inefficient depending on the scale of the reactor.

In order for the conversion reaction to take place, the feed gas must be heated from about 450° C. to greater than about 600° C. At these temperatures carbon heaters suffer from radiant and convective heat loss. Carbon heaters can also be prone to mechanical failure by cracking.

The desire for improving the heat transfer coefficient in a well-insulated reactor lead to the invention herein.

SUMMARY OF THE INVENTION

Incidentally, according to the study of the present inventor, metallurgical grade silicon powder is fluidized at the lower part of the reactor by ascending hydrogen gas and STC which is introduced from there below, and the metallurgical grade silicon powder is contacted with the hydrogen gas and STC to cause a reaction during fluidization.

The invention involves stacked carbon elements. The design of the elements allow them to act as baffles which improve heat transfer to the feed gas. Also, the heat gradients across each baffle was estimated to be in the range of about 100° C. which is much lower than the gradient seen by conventional vertical heater elements. The design of the present invention prevents electrical grounding between the heating element, insulation and the reactor. In the design, the elements are surrounded by graphite wrapped in carbon felt to prevent heat loss by radiation and conduction.

This invention is used to heat the feed process gas for the FBR reactor used for conversion of silicon tetrachloride (STC) to trichlorosilane (TCS). The electrodes in the reactor are powered by a power supply. Power required depends on the throughput of the reactor. The electrodes are surrounded by quartz to prevent grounding with the surrounding insulation. The electrode passes current to the bottom most plate through contact with a carbon nut. Every subsequent plate transfers current to the next plate by a carbon spacer. The potential difference across each plate is low resulting in a low probability for arching. Ceramic sleeves are used to prevent grounding with the carbon rods. When the current has reached the top most plate, the electricity is passed to the return electrode through a carbon rod. One carbon rod does not pass electrical current but acts as a support. Both carbon rods are threaded at both ends so that a nut may be used to compress the entire stack and ensure good electrical conductance.

The element stack is surrounded by graphite. The graphite provides a concrete medium on which to wrap carbon felt. Even though the graphite is thermally conductive, the carbon felt has superior insulating properties and heating loss to conduction and radiation is minimized. The floating design of the graphite wrapped in felt will help prevent carbon cracking.

The carbon elements are chamfered reducing stress at natural corners. Heat transfer effect was estimated by considering the element as a cylinder submerged in a fluid. The carbon elements are arranged to provide a good baffle design. The two carbon elements are arranged in first orientation designated as A to B orientation, meaning a carbon element B with a pattern B is stacked on top of a carbon element A with a pattern A which is designated as A to B. A and B patterns are different from each other. The next carbon element to be placed on the carbon element with pattern B is the carbon element A with pattern A which is placed upside down, so that upside down pattern A is the reverse of right side up pattern A. This ensures a good baffling effect for the rising gas to be heated. Next the carbon element B with pattern B is placed upside down on top of upside down carbon element A with pattern A. This orientation is designated as upside down A to upside down B. The pattern of A to B to upside down A to upside down B is continuously repeated among the carbon elements on the heater element stack. In this fashion of carbon element stacking, heat transfer is improved by the good baffle action of the carbon elements.

The STC feed gas to the conversion rector is heated from about 450° C. to greater than about 600° C. by a novel heater assembly. The gas, once heated, is able to react in the conversion reactor to form TCS.

DETAILED DESCRIPTION OF THE INVENTION

Figure 1:
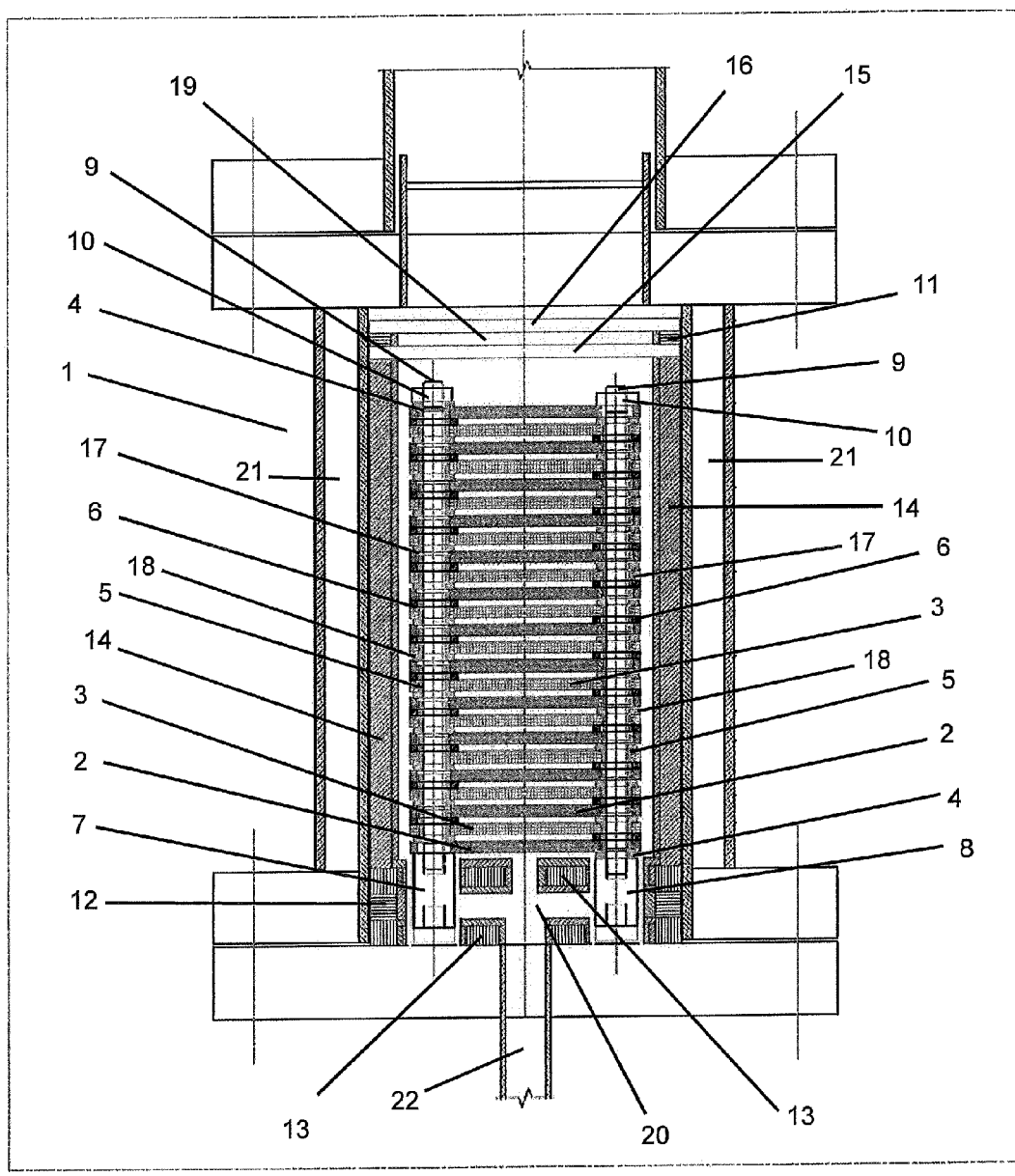
FIG. 1 is a cross-sectional view of a heater element stack.

Hereinafter, an explanation will be made of an embodiment of the present invention with reference to the drawings.

An apparatus for producing trichlorosilane is provided with a reactor, raw material supply device for supplying metallurgical grade silicon powder (Me-Si) as a raw material to the reactor, a feed gas introduction device for introducing hydrogen gas and STC which reacts with the metallurgical grade silicon powder, and a gas discharge device for discharging the generated gas containing trichlorosilane.

The reactor is provided with a body formed substantially in a straight cylindrical shape along the vertical direction, a bottom connected to the lower end of the body, and a large diameter portion connected coaxially to the upper end of the body. In this embodiment, the body is formed with a substantially similar diameter to the bottom and the space therebetween is partitioned by a horizontal distributor plate. On the other hand, a tapered portion is formed at the upper part of the body, and the large diameter portion is integrally connected to the upper end of the tapered portion. The diameter of the tapered portion gradually increases in the upper direction thereof. Thus, the internal space of the body is communicatively connected to that of the large diameter portion.

The raw material supply device supplies metallurgical grade silicon powder (Me-Si) (for example, the size is 1 μm or more and 1000 μm or less) from a raw material feed hopper via a raw material supply tube connected to the lower part of the body of the reactor. In this configuration, the metallurgical grade silicon powder is supplied by gas transportation using hydrogen as a carrier gas.

On the other hand, the feed gas introduction device introduces hydrogen gas and STC into the bottom of the reactor via a gas supply tube.

A plurality of nozzles are fixed along the vertical direction so as to penetrate the distributor plate which partitions the bottom of the reactor from the body. The upper end openings of the nozzles are arranged inside the body and the lower end opening is arranged inside the bottom. Then, hydrogen gas and STC are introduced by the feed gas introduction device into the bottom of the reactor is ejected dispersively into the body by each of the nozzles.

Further, dispersing materials formed in spheres of various sizes, plate-shaped pieces of various sizes and dimensions with holes or the like are laid densely on the distributor plate.

The gas discharge device sends the reacted fluid including trichlorosilane discharged from the reactor to a gas purifying system via dust/gas separation devices, and collects the metallurgical grade silicon fine powder (for example, the diameter is 1 μm or more and 200 μm or less) discharged along with the reacted fluid in the dust/gas separation devices to be returned to the raw material feed hopper via a recovery tube or for disposal.

The feed gas introduction device introduces hydrogen gas and STC into the bottom of the reactor via the gas supply tube. The feed gas must be heated from about 450° C. to greater than about 600° C. Target reaction temperature of greater than 550° C. must be achieved as bulk reaction temperature. Gas temperature out of the heater must be hotter to account for: achieving target temperature; endothermic reaction; thermal loss in reactor bed; and additional thermal loss in heater section. The size of the heater is determined by the desired throughput.

To heat the feed gas, a heater having a good heat transfer coefficient, good insulation, good mechanical durability with minimal contamination to the feed gas is desired. A heater having a combination heater element and baffle stacked in series and being well grounded and well insulated, as described herein, achieves the desired heating and mechanical requirements.

FIG. 1 is a cross-sectional view of a heater element stack 1 of the present invention. The heater element stack 1 has the following components:

a heater element carbon plate A 2 wherein the heater element follows a serpentine path between two alignment holes 17;

a heater element carbon plate B 3 wherein the heater element follows a serpentine path between two alignment holes 17, a different path design from the serpentine path of the heater element of heater element carbon plate A2, and wherein the heater element carbon plate A 2 and the heater element carbon plate B 3 are alternately stacked upon each other arranged as A to B to upside-down A to upside-down B to A to B, etc.;

a heater element ceramic short sleeve 4 located at one end of each of the stacks of the heater element carbon plates A 2 and B 3 at the alignment hole 17;

a heater element ceramic sleeve 5 extending though each alignment hole 17 of one heater element carbon plate A 2 and one heater element carbon plate B 3 and the heater element ceramic sleeve 5 having a stepped end 18 which serves as a spacer between two heater element carbon plates A 2 and B 3;

a heater element carbon space (type #1) 6 which surrounds the heater element ceramic sleeve 5 and serves as a spacer between two heater element carbon plates A 2 and B 3 such that each heater element carbon plate A 2 and B 3 is spaced from the next heater element carbon plate A 2 and B 3, at each alignment hole 17, by the stepped end 18 of the ceramic sleeve 5 on one side and the carbon space (type #1) 6 on the other side;

a heater element carbon cap (type #1) 7 located between and directly contacting a first electrode and the first heater element carbon plate A 2; a heater element carbon cap (type

2) 8 located between and directly contacting a second electrode and the heater element ceramic short sleeve 4 located at one end of each of the stacks of the heater element carbon plates;

a heater element carbon rod 9 which passes though all heater element ceramic sleeves to prevent contact and subsequent grounding, and is connected at a bottom end to the heater element carbon cap 7 on one side and the heater element carbon cap 8 on the opposite side;

a heater element carbon nut 10 located at the top of each of the heater element carbon rods 9 opposite the heater element carbon caps 7 and 8 to screw down and hold together the entire stack of heater element carbon plates A 2 and B 3;

an outlet plenum center spacer ring 11 located at the outlet plenum 19;

an inlet plenum center spacing ring 12 located at the inlet plenum 20;

an inlet plenum insulation 13 located at the top and bottom of the inlet plenum 20;

a heater element insulation 14 surrounding the heater element carbon plates A 2 and B 3;

an upper carbon insulation perforated plate A 15 located at the outlet plenum 19 above the heater element insulation 14; and an upper carbon insulation perforated plate B 16 located at the outlet plenum 19 above the outlet plenum center spacer ring 11 which is on top of the upper carbon insulation perforated plate A 15.

The entire heater element stack 1 is surrounded by a water jacket 21. The heater element stack 1 has a plurality of carbon plates. The embodiment shown in FIG. 1 has 25 carbon plates, however this number can vary and can include any number of carbon plates depending on the dimensions and desired output temperatures. The number of upper carbon insulation perforated plates can also be varied depending on the heater design.

The heater element stack 1 operates as follows: The heater element stack 1 is heated by passing electric current from a power supply (not shown) to the first electrode (not shown) to the heater element carbon cap (type #1) 7 located between and directly contacting the first electrode and the first heater element carbon plate A 2. The electrodes are surrounded by quartz to prevent grounding with the surrounding insulation. The first electrode passes current to the bottom most heater element carbon plate A 2 through contact with the heater element carbon cap (type #1) 7. Every subsequent plate A 2 and B 3 transfers current to the next plate by the heater element carbon space (type #1) 6. The potential difference across each plate is low, so the probability for arching is small. The heater element ceramic sleeves 5 are used to prevent grounding with the heater element carbon rods 9. When the current has reached the top most heater element carbon plate A 2, the electricity is passed to the return electrode (not shown) through the heater element carbon rod 9. One heater element carbon rod 9 (the left carbon rod 9 in FIG. 1) does not pass electrical current. Both heater element carbon rods 9 are threaded at both ends so that the heater element carbon nut 10 may be used to compress the entire stack and ensure good electrical conductance.

The heater element stack 1 is surrounded by graphite. The graphite provides a concrete medium on which to wrap carbon felt. Even though the graphite is thermally conductive, the carbon felt has superior insulating properties and heating loss to conduction and radiation is minimized. The floating design of the felt wrapped in graphite helps to prevent carbon cracking.

The greatest temperature predicted is approximately 700° C. to 900° C. for heater element carbon plate A 2 number 22 from the bottom of the heater element stack 1. This is well within carbon's mechanical abilities and lower than the temperature at which contamination from the carbon is a concern. The temperature gradient predicted across heater element carbon plate A 2 number 11, from the bottom of the stack for example, is approximately 100° C. This is a smaller gradient then present long vertical heater elements. The top two baffles, the upper carbon insulation perforated plate A 15 and upper carbon insulation 40 plate B 16, above the heater element stack, ensure complete mixing of the process gas before it passes into the distributor section. The top two baffles, the upper carbon insulation perforated plate A 15 and upper carbon insulation perforated plate B 16 also protect the distributor plate in the distributor section from overheating while minimizing heat loss.

The feed gas enters into the heater element stack 1 through conduit 22. The feed gas passes through two inlet plenum insulation 13 members separated by the inlet plenum center spacer ring 12. The feed gas then contacts the first heater element carbon plate A 2 which acts as a baffle to the feed gas so that the feed gas cannot rise in a straight path from the inlet plenum 20 to the outlet plenum 19. The feed gas then contacts heater element carbon plate B 3 which also acts as a baffle to the feed gas.

Thereafter the feed gas rises in the heater element stack 1 contacting the next heater element carbon plate A 2 and the next heater element carbon plate B 3 which are alternately stacked upon each other arranged as A to B to upside-down A to upside-down B to A to B etc.

After contacting the upper most heater element carbon plate A 2, the feed gas passes through the upper carbon insulation perforated plate A 15 located at the outlet plenum 19 above the heater element insulation 14 and the upper carbon insulation perforated plate B 16 located at the outlet plenum 19 above the outlet plenum center spacer ring 11 which is on top of the upper carbon insulation perforated plate A 15.

The feed gas is adequately heated and passes through the upper plenum 19 and into the distributer (not shown) of the FBR.

The heater element stack is insulated. At the bottom of the heater element stack 1, there are two inlet plenum insulation 13 members located at the top and bottom of the inlet plenum 20 separated by the inlet plenum center spacing ring 12. At the top of the heater element stack 1, there is the upper carbon insulation perforated plate A 15 located at the outlet plenum 19 above the heater element insulation 14 and the upper carbon insulation perforated plate B 16 located at the outlet plenum 19 above the outlet plenum center spacer ring 11 which is on top of the upper carbon insulation perforated plate A 15. Between the upper carbon insulation perforated plate A 15 and the upper most inlet plenum insulation 13 member is the heater element insulation member 14. The entire heater element stack 1 is surrounded by the water jacket 21 to cool the reactor walls to within acceptable tolerances.

Figure 2:
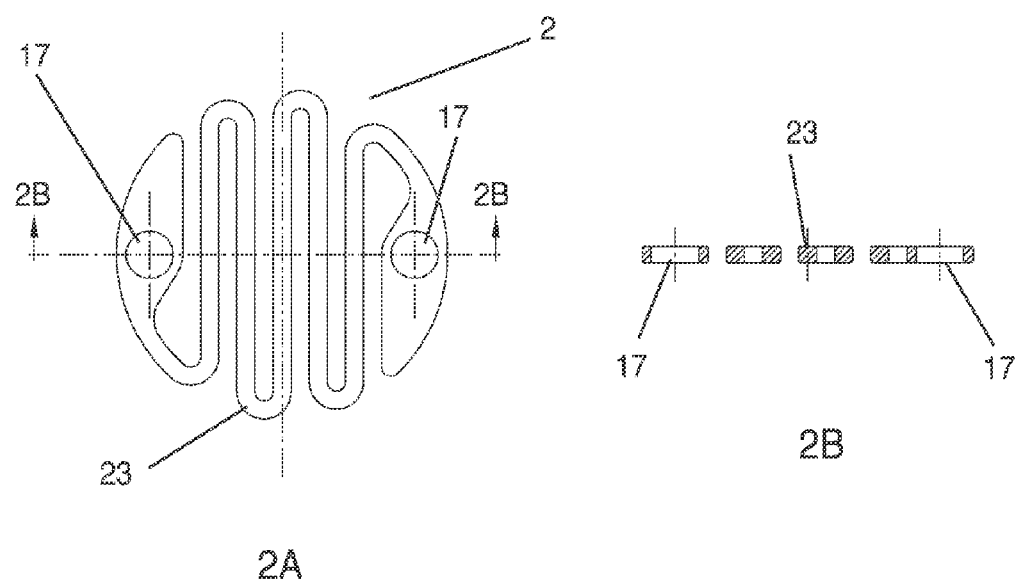
FIG. 2A is a plan view of a first heater element carbon plate A and FIG. 2B is a cross-sectional view of the first heater element carbon plate A taken along line 2B-2B.

FIG. 2A is a plan view of the first heater element carbon plate A 2 and FIG. 2B is a cross-sectional view of the first heater element carbon plate A 2 taken along line 2-2. The entire first heater element carbon plate A 2 is a heater element. The first heater element 23 follows a serpentine path between two alignment holes 17 on opposite sides of the first heater element carbon plate A 2. The embodiment shown in FIG. 2 shows a particular serpentine path, however other serpentine path designs are possible between the alignment holes 17. The portion of the heater element 23 surrounding the alignment holes 17 is wider than the heater element 23 which winds in serpentine, zigzag pattern between the alignment holes 17. Heater element 23 of carbon plate A 2 is heavily chamfered.

Figure 3:
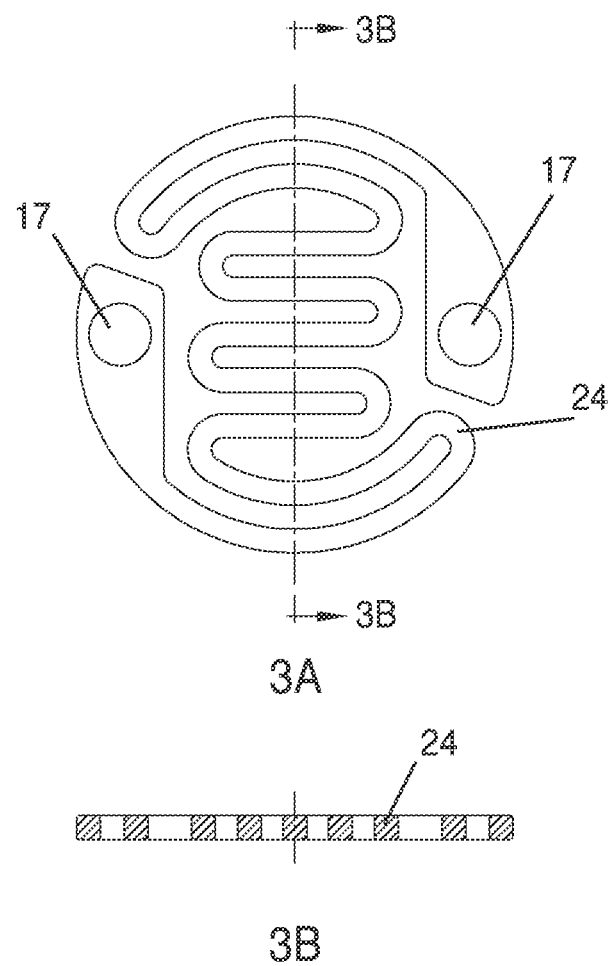
FIG. 3A is a plan view of a second heater element carbon plate B and FIG. 3B is a cross-sectional view of the second heater element carbon plate B taken along line 3B-3B.

FIG. 3A is a plan view of the second heater element carbon plate B 3 and FIG. 3B is a cross-sectional view of the second heater element carbon plate B 3 taken along line 3B-3B. The entire second heater element carbon plate B 3 is a heater element 24. The second heater element 24 follows a serpentine path between two alignment holes 17 on opposite sides of the first heater element carbon plate B 3. The embodiment shown in FIG. 3 shows a particular serpentine path, however other serpentine path designs are possible between the alignment holes 17. The portion of the heater element 24 surrounding the alignment holes 17 is wider than the heater element 24 which winds in serpentine, zigzag pattern between the alignment holes 17. Heater element 24 of carbon plate B 3 is heavily chamfered.

Figure 4:
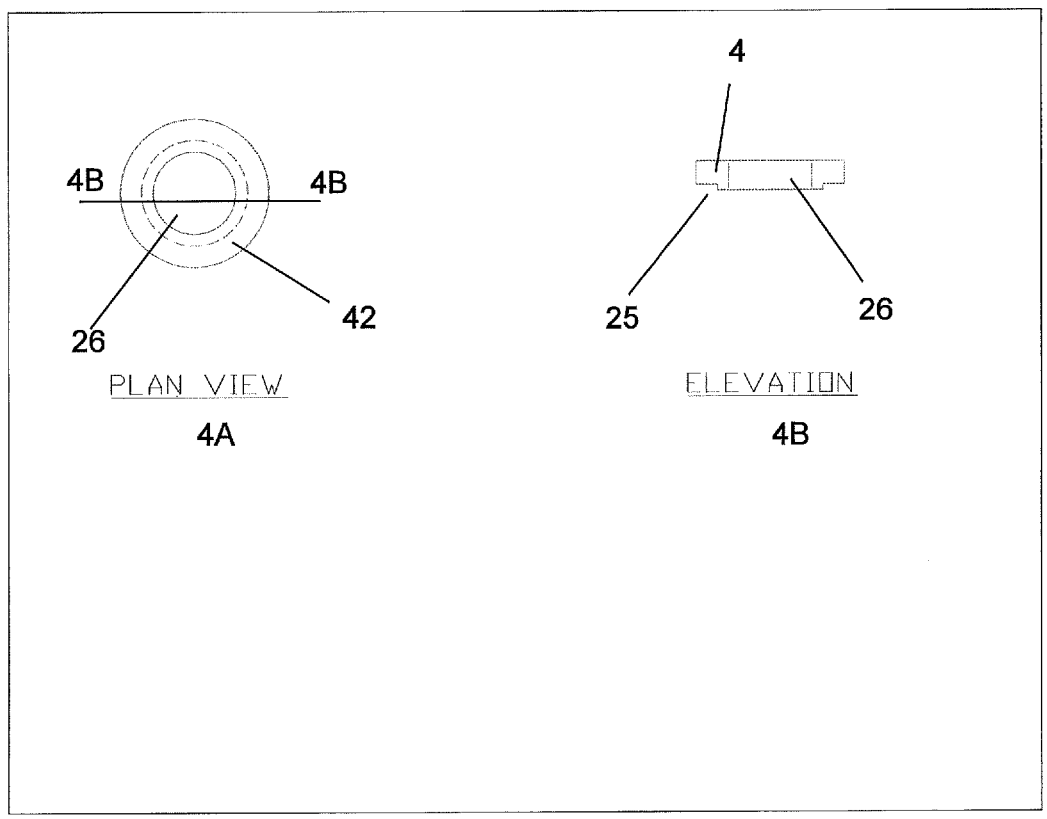
FIG. 4A is a plan view of a heater element ceramic short sleeve and FIG. 4B is a cross-sectional view of the heater element ceramic short sleeve taken along line 4B-4B.

FIG. 4A is a plan view of the heater element ceramic short sleeve 4 and FIG. 4B is a cross-sectional view of the heater element ceramic short sleeve 4 taken along line 4B-4B. The short sleeve 4 is either located between the upper most heater element carbon plate A 2 and the carbon nut 10 or between the lower most heater element carbon plate A 2 and the carbon cap (type #1) 8. The short sleeve is designed to complete the stack of ceramic sleeves 5 either at the top or bottom of the stack of ceramic sleeves 5. The short sleeve 4 has a notched design 25 so that it can sit securely in the corresponding indentation in the heater element carbon plate A 2 (or B 3 depending on the heater element stack 1 configuration). While the ceramic sleeve 5 is long enough to be inserted through the alignment holes 17 of two heater element carbon plates A 2 and B 3, the short sleeve 4 is only long enough to be partially inserted in the alignment hole 17 of one heater element carbon plate A 2 (or B 3 depending on the heater element stack 1 configuration). Short sleeve 4 has a hole 26 for accepting the carbon rod 9.

Figure 5:
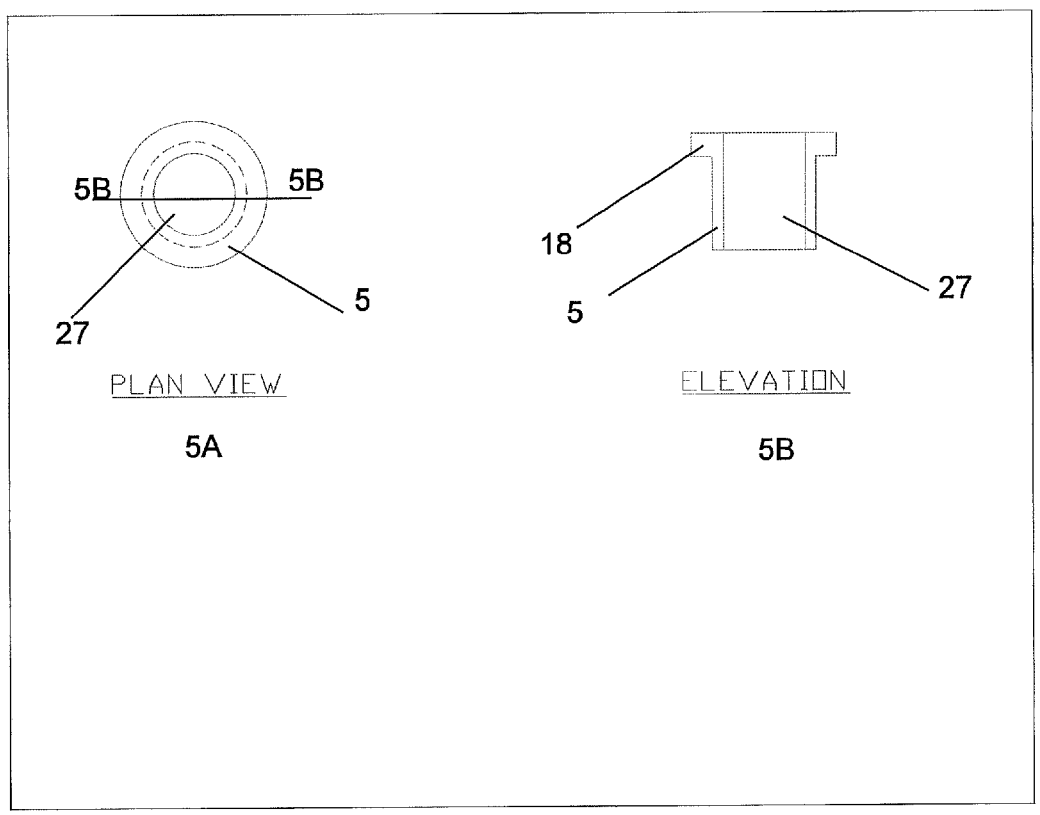
FIG. 5A is a plan view of a heater element ceramic sleeve and FIG. 5B is a cross-sectional view of the heater element ceramic sleeve taken along line 5B-5B.

FIG. 5A is a plan view of the heater element ceramic sleeve 5 and FIG. 5B is a cross-sectional view of the heater element ceramic sleeve 5 taken along line 5B-5B. The ceramic sleeve 5 is long enough to be inserted through the alignment holes 17 of two heater element carbon plates A 2 and B 3. Ceramic sleeve 5 has hole 27 for accepting the carbon rod 9. Ceramic sleeve also has a stepped portion 18 which create a step of ceramic material which serves as a spacing element between two heater element carbon plates A 2 and B 3.

Figure 6:
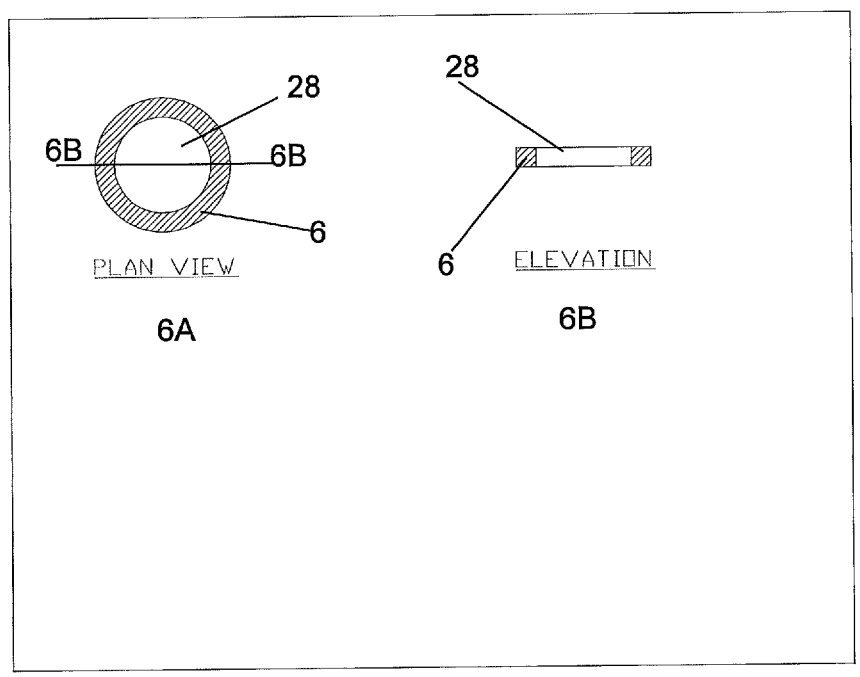
FIG. 6A is a plan view of a heater element carbon space (type #1) and FIG. 6B is a cross-sectional view of the heater element carbon space (type #1) taken along line 6B-6B.

FIG. 6A is a plan view of the heater element carbon space (type #1) 6 and FIG. 6B is a cross-sectional view of the heater element carbon space (type #1) 6 taken along line 6B-6B. Carbon space 6 is in a ring shape with a hole 28 designed to accept carbon sleeve 5. The carbon space 6 serves as a spacing element between two heater element carbon plates A 2 and B 3.

Figure 7:
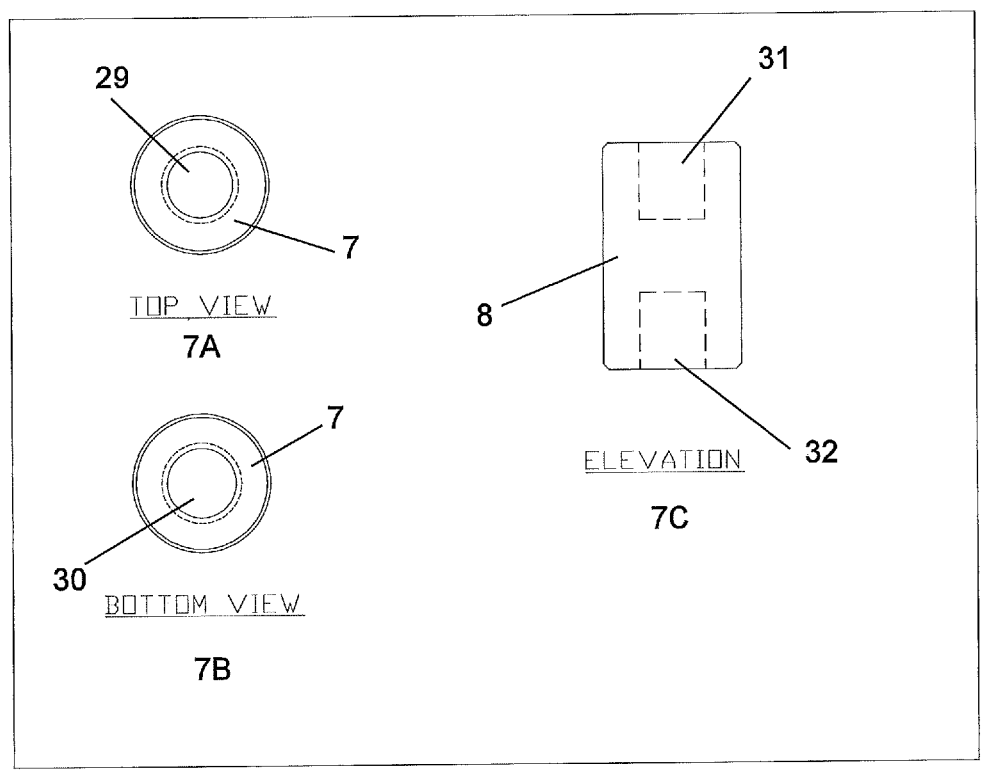
FIG. 7A is a plan top view of a heater element carbon cap (type #1)
FIG. 7B is a plan bottom view of the heater element carbon cap (type #1)
FIG. 7C is a plan view of the heater element carbon cap (type #1)

FIG. 7A is a plan top view of the heater element carbon cap (type #1) 7, FIG. 7B is a plan bottom view of the heater element carbon cap (type #1) 7, and FIG. 7C is a plan view of the heater element carbon cap (type #1) 7. The cylindrical carbon cap 7 is a carbon part designed to accept an electrode in a lower hole 30 and the carbon rod 9 in an upper hole 29. The upper hole 29 and the lower hole 30 do not join, rather they are separated by the carbon cap 7 in between the two holes.

Figure 8:
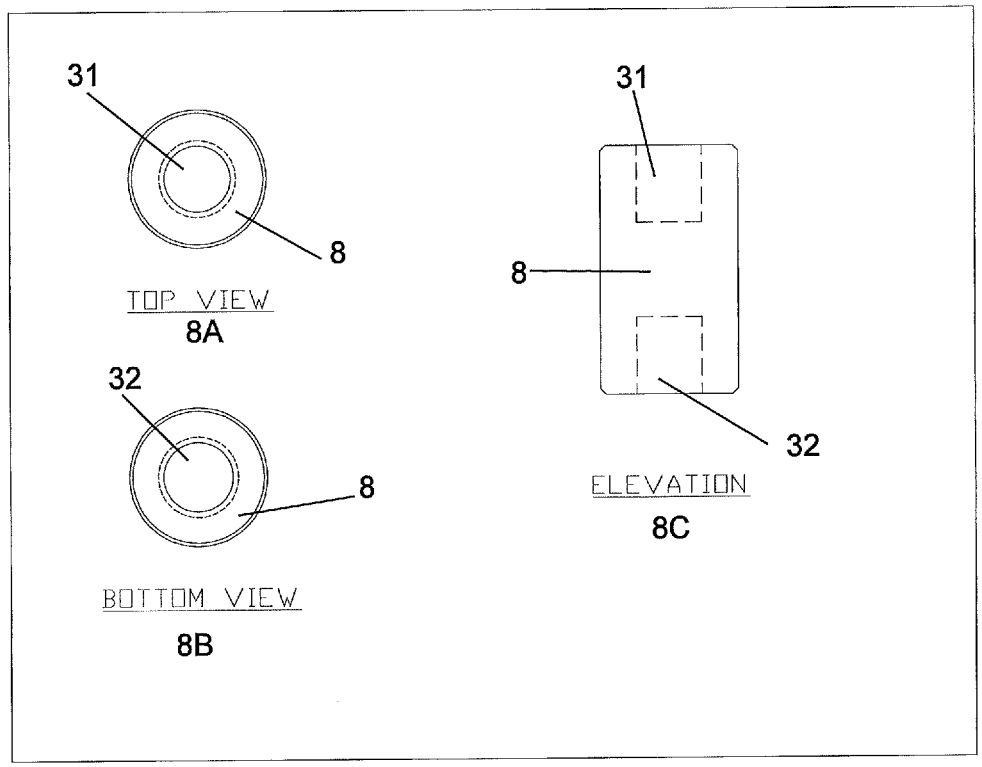
FIG. 8A is a plan view of a heater element carbon cap (type #2)
FIG. 8B is a plan bottom view of the heater element carbon cap (type #2)
FIG. 8C is a plan view of the heater element carbon cap (type #2)

FIG. 8A is a plan view of the heater element carbon cap (type #2) 8, FIG. 8B is a plan bottom view of the heater element carbon cap (type #2) 8, and FIG. 8C is a plan view of the heater element carbon cap (type #2) 8. The cylindrical carbon cap 8 is a carbon part designed to accept an electrode in a lower hole 32 and the carbon rod 9 in an upper hole 31. The upper hole 31 and the lower hole 321 do not join, rather they are separated by the carbon cap 8 in between the two holes.

Figure 9:
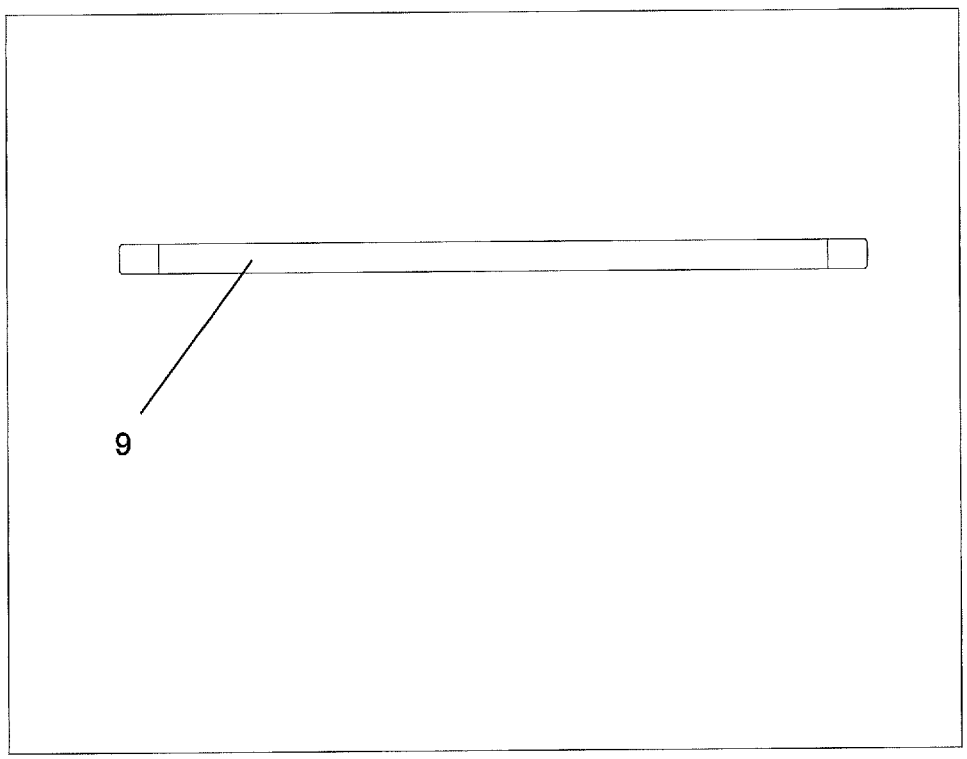
FIG. 9 is a plan view of a heater element carbon rod.

FIG. 9 is a plan view of the heater element carbon rod 9. The heater element stack 1 has two carbon rods 9. The carbon rod 9 is threaded at either end so as to be connected or fitted into either carbon cap 7 or carbon cap 8 at the bottom and threaded with a carbon nut 10 at the top. In the heater element stack 1 in FIG. 1 the left carbon rod 9 does not pass electric current, rather electric current is passed between the heater element carbon plate A 2 and B 3 by carbon spacer 6. Electric current is passed down the right carbon rod 9 into the electrode attached to the carbon cap 8.

Figure 10:
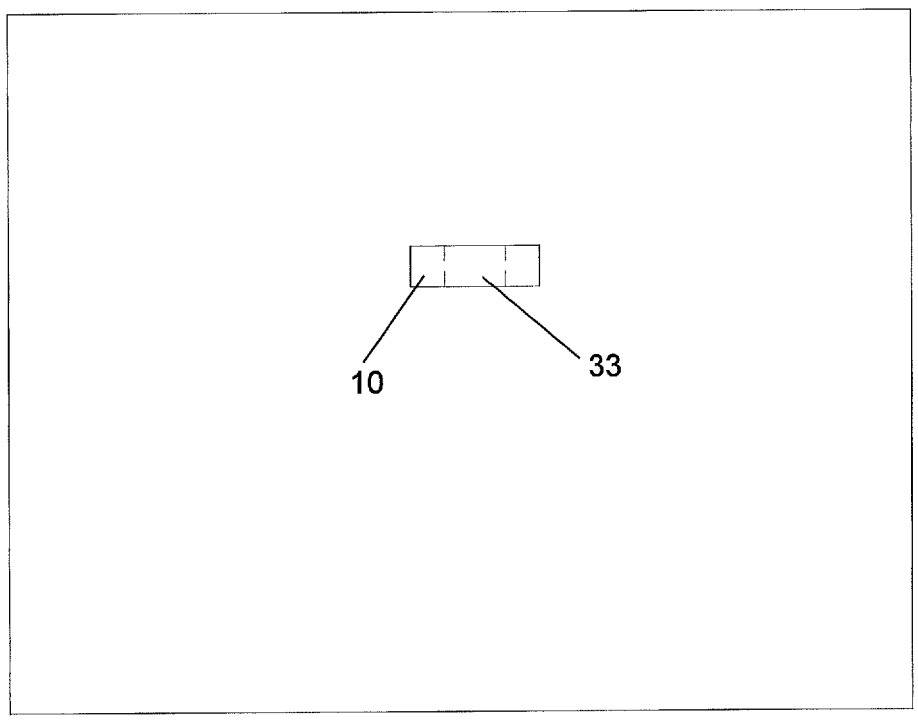
FIG. 10 is a plan view of a heater element carbon nut.

FIG. 10 is a cross-sectional view of the heater element carbon nut 10. The carbon nut 10 is threaded to screw onto the carbon rod 9. The carbon nut 10 is screwed onto the carbon rod 9 to compress the stack of alternating heater element carbon plates A 2 and B 3. Carbon nut has hole 33 to accept carbon rod 9.

Figure 11:
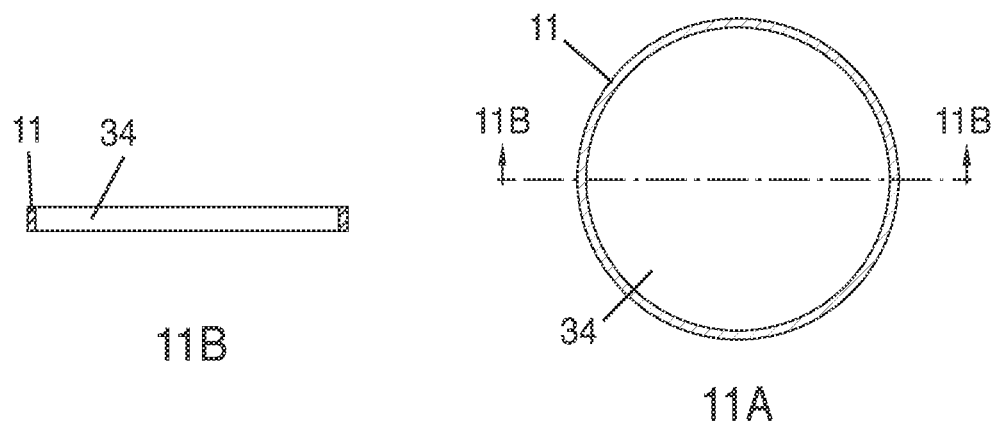
FIG. 11A is a plan view of an outlet plenum center spacer ring and FIG. 11B is a cross-sectional view of the outer plenum center spacer ring taken along line 11B-11B.

FIG. 11A is a plan view of the outlet plenum center spacer ring 11 and FIG. 11B is a cross-sectional view of the outer plenum center spacer ring 11 taken along line 11B-11B. The outer plenum center spacer ring 11 is located between the upper carbon insulation perforated plate B 16 located at the outlet plenum 19 above the outlet plenum center spacer ring 11 and the upper carbon insulation perforated plate A 15. The upper plenum center spacer ring 11 has hole 34 which surrounds the upper plenum 19.

Figure 12:
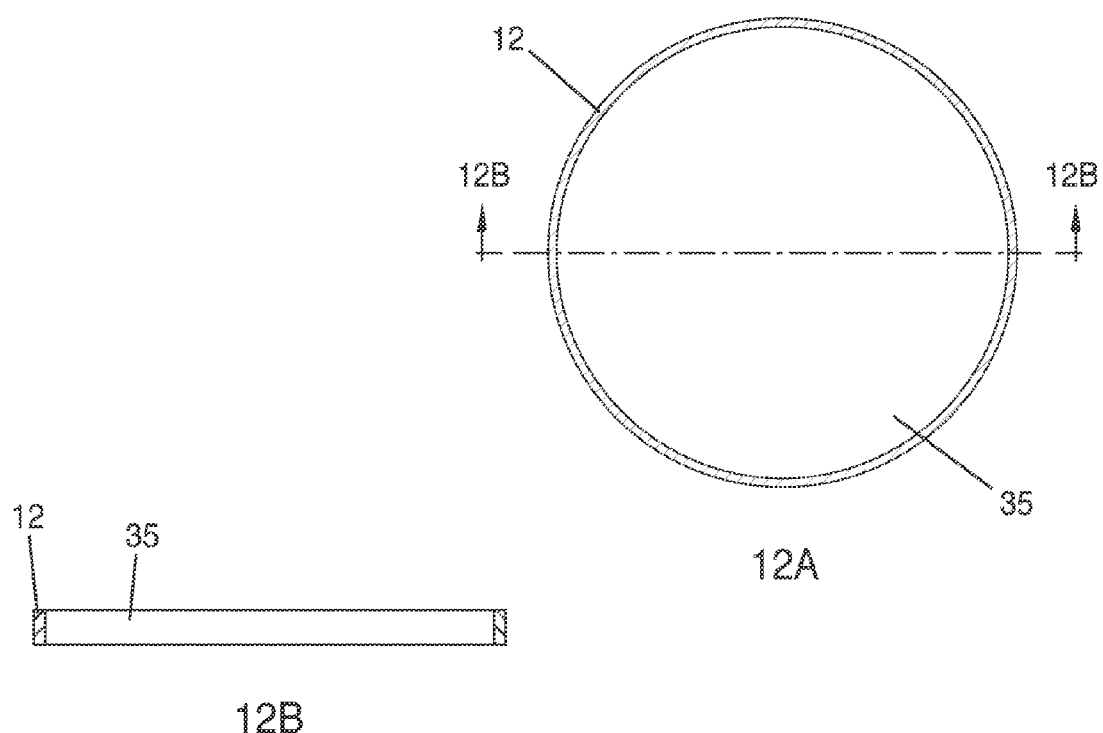
FIG. 12A is a plan view of an inlet plenum center spacer ring and FIG. 12B is a cross-sectional view of the inlet plenum center spacer ring taken along line 12B-12B.

FIG. 12A is a plan view of the inlet plenum center spacer ring 12 and FIG. 12B is a cross-sectional view of the inlet plenum center spacer ring 12 taken along line 12B-12B. The two inlet plenum insulation 13 members located at the top and bottom of the inlet plenum 20 are separated by the inlet plenum center spacing ring 12. The inlet plenum center spacing ring 12 has hole 35 which surrounds the inlet plenum.

Figure 13:
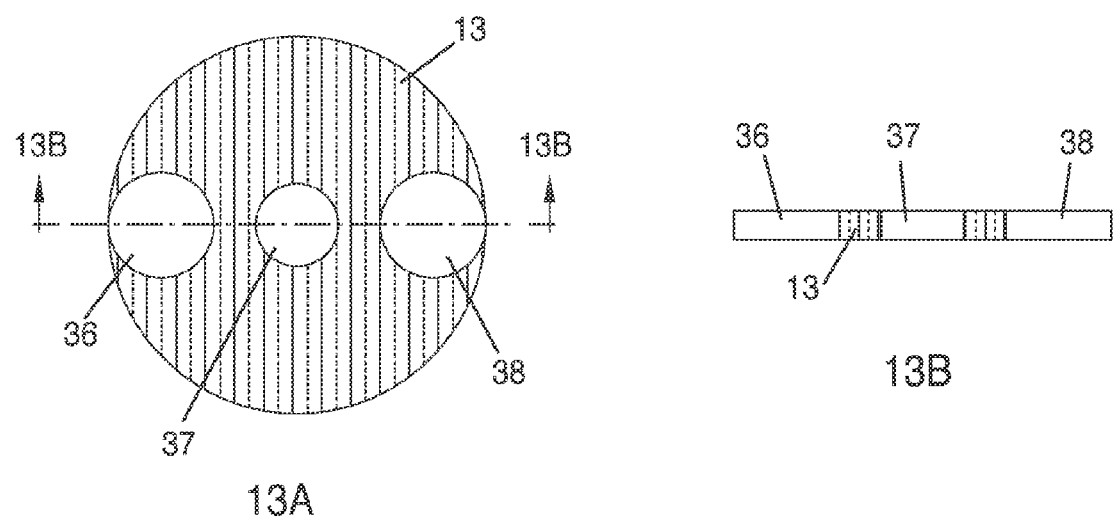
FIG. 13A is a plan top view of an inlet plenum insulation.
FIG. 13B is a cross-sectional view of the inlet plenum insulation taken along line 13B-13B.

FIG. 13A is a plan top view of the inlet plenum insulation 13; FIG. 13B is a cross-sectional view of the inlet plenum insulation 13 taken along line 13B-13B. Inlet plenum insulation has two holes 36 and 38 for accepting carbon rod 9 and a hole 37 for feed gas flow. The heater element stack 1 can have one or more inlet plenum insulation 13 members. In FIG. 1 there are two inlet plenum insulation 13 members separated by inlet plenum center spacing ring 12.

Figure 14:
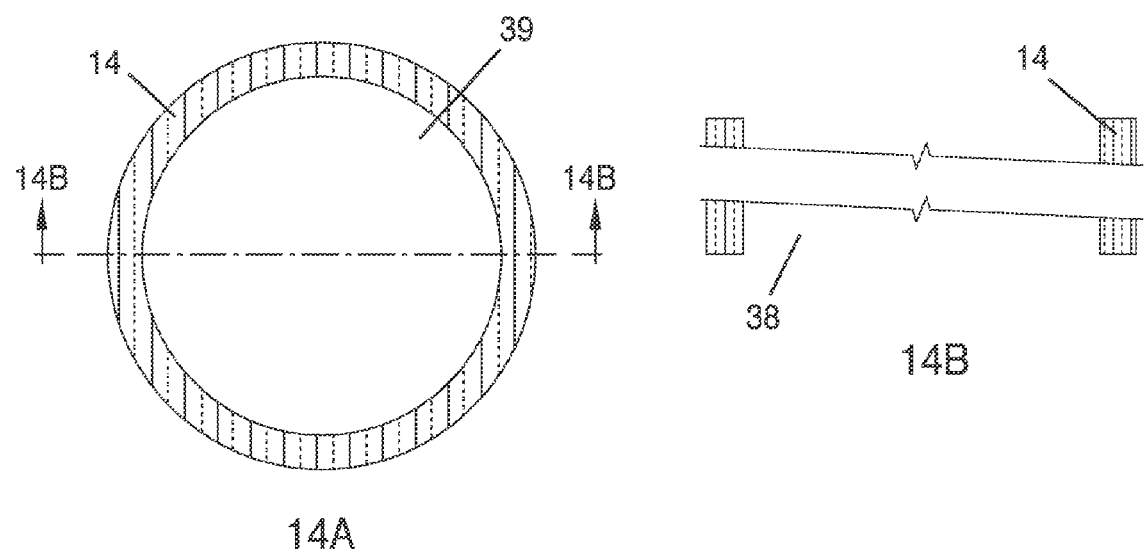
FIG. 14A is a plan top view of a heater element insulation.
FIG. 14B is a cross-sectional view of the heater element insulation taken along line 14B-14B.

FIG. 14A is a plan top view of the heater element insulation 14, FIG. 14B is a cross-sectional view of the heater element insulation taken along line 14B-14B. The heater element insulation 14 has hole 39 which surrounds heater element stack 1.

Figure 15:
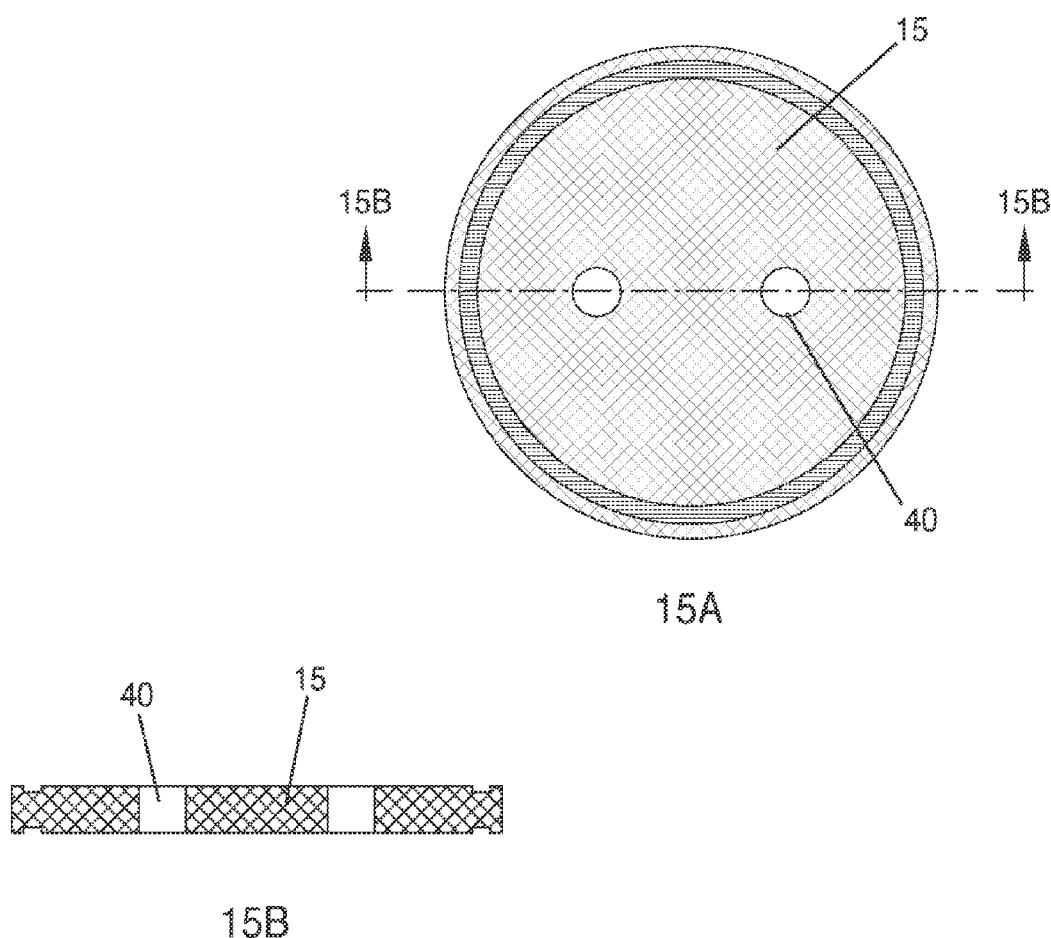
FIG. 15A is a plan view of an upper carbon insulation perforated plate A and FIG. 15B is a cross-sectional view of the upper carbon insulation perforated plate A taken along line 15B-15B.

FIG. 15A is a plan view of the upper carbon insulation perforated plate A 15 and FIG. 15B is a cross-sectional view of the upper carbon insulation perforated plate A 15 taken along line 15B-15B. Upper carbon insulation perforated plate A 15 has perforated holes 40. Additional holes are possible depending on the desired design. At the top of the heater element stack 1, there is the upper carbon insulation perforated plate A 15 located at the outlet plenum 19 above the heater element insulation 14 and the upper carbon insulation perforated plate B 16 located at the outlet plenum 19 above the outlet plenum center spacer ring 11 which is on top of the upper carbon insulation perforated plate A 15. Between the upper carbon insulation perforated plate A 15 and the upper most inlet plenum insulation 13 member is the heater element insulation member 14.

Figure 16:
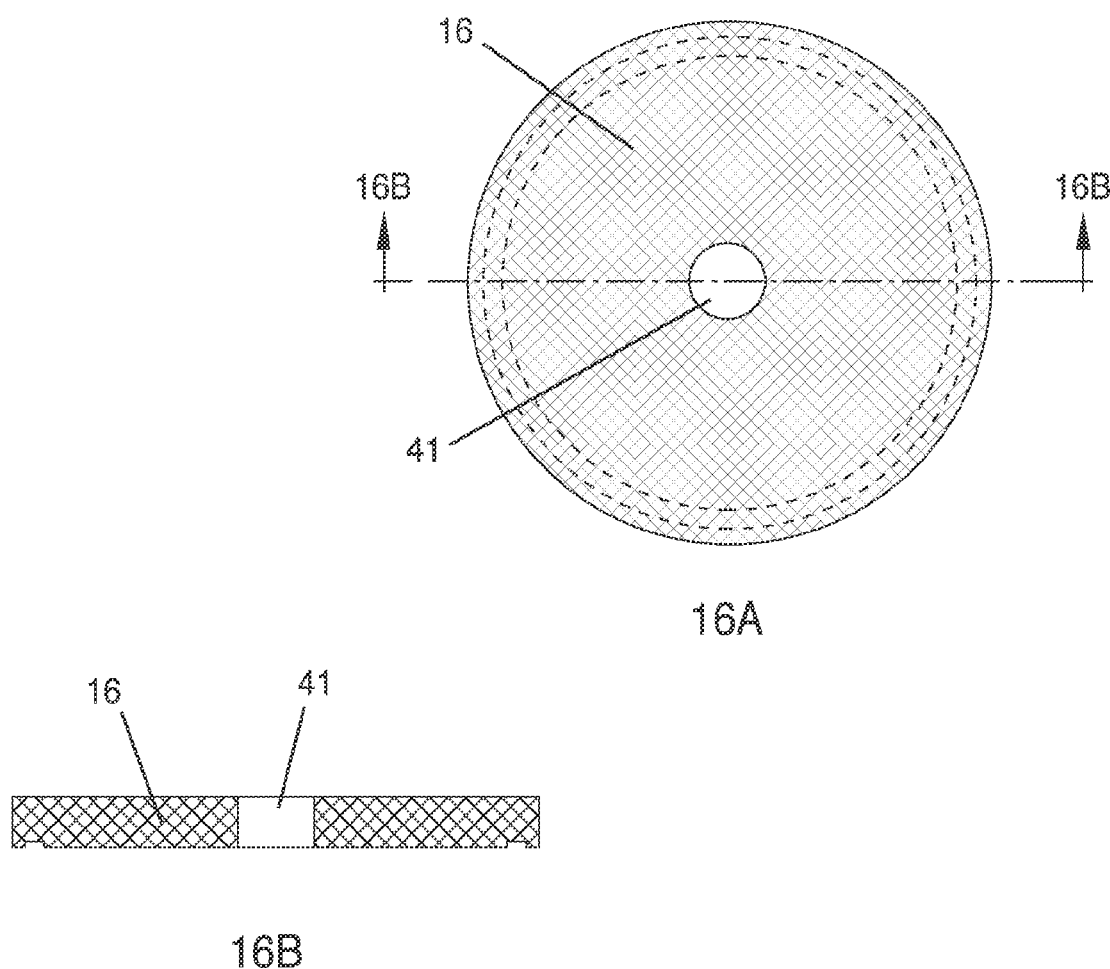
FIG. 16A is a plan view of an upper carbon insulation perforated plate B and FIG. 16B is a cross-sectional view of the upper carbon insulation perforated plate B taken along line 16B-16B.

FIG. 16A is a plan view of an upper carbon insulation perforated plate B 16 and FIG. 16B is a cross-sectional view of the upper carbon insulation perforated plate B 16 taken along line 16B-16B. Upper carbon insulation perforated plate A 15 has a perforated hole 41 and different hole pattern than the upper carbon insulation perforated plate A 15. Additional holes are possible depending on the desired design.

The entire heater element stack 1 is surrounded by the water jacket 21 to cool the reactor walls.

The present invention promotes efficient heating of gas with a longer heater element length (i.e.) the total element length in one example is over 93 feet (28.5 m)), good insulation (i.e.) the total heat loss in the heater section is approximately 6%) and the heater stack 1 design promotes turbulent gas flow (but with heavily chamfered parts the rounded corners of the parts are able to hold the gas flow, promote gas to gas contact and gas to heater element contact and avoid gas delamination). Thus the overall design results in a good heat transfer coefficient.

The overall design is a floating design where the heater element carbon plate A 2 or B3, the ceramic sleeve 5 the carbon space 6 can be removed and replaced without removing all of the heater element carbon plates A 2 or B3 above or below the part to be replaced.

Furthermore with the invention design the number and types of parts used is minimized with minimized cost.

The invention and embodiment are described for illustrative, but not limitative purposes. It is to be understood that changes and/or modifications can be made by those skilled in the art without for this departing from the related scope of protection, as defined by the enclosed claims.

What is claimed is:

1. An apparatus for producing trichlorosilane comprising:
a reactor;
a raw material supply device that supplies metallurgical grade silicon powder as raw material to the reactor;
a gas introduction device that introduces a feed gas, comprising at least a hydrogen gas and STC, to the reactor so that the hydrogen gas and STC reacts with the metallurgical grade silicon powder while the metallurgical grade silicon powder is fluidized by the hydrogen gas and STC;
a heater of stacked heater element carbon plates for heating the feed gas before contact with the metallurgical grade silicon power; and
a gas discharge device that discharges generated gas containing trichlorosilane from the reactor,
wherein the heater element stacked carbon plates are surrounded by graphite wrapped in carbon felt to prevent heat loss by radiation and conduction.

2. The apparatus of claim 1, wherein the heater element stacked carbon plates act as baffles for the feed gas.

3. The apparatus of claim 1, where the gradient across each heater element stacked carbon plate is approximately 100° C.

4. The apparatus of claim 1, wherein electric current is supplied to the carbon plates by a supply electrode.

5. The apparatus of claim 4, wherein the electrodes are surrounded by quartz to prevent grounding with surrounding insulation.

6. The apparatus of claim 1, wherein top two baffles, above the heater element stack, ensure complete mixing of a heated gas before the heated gas passes into the distributor section.

7. The apparatus of claim 1, wherein a greatest temperature predicted is 890° C. for heater element carbon plate number 22.

8. The apparatus of claim 1, wherein the heater element carbon plates are chamfered.

9. The apparatus of claim 1, wherein the heater element carbon plates are arranged in a repeating pattern of A to B to upside-down A to upside-down B.

10. An apparatus for producing trichlorosilane comprising:
a reactor;
a raw material supply device that supplies metallurgical grade silicon powder as raw material to the reactor;
a gas introduction device that introduces a feed gas, comprising at least a hydrogen gas and STC, to the reactor so that the hydrogen gas and STC reacts with the metallurgical grade silicon powder while the metallurgical grade silicon powder is fluidized by the hydrogen gas and STC;
a heater of stacked heater element carbon plates for heating the feed gas before contact with the metallurgical grade silicon power; and
a gas discharge device that discharges generated gas containing trichlorosilane from the reactor,
wherein each heater element stacked carbon plate has an alignment hole on each opposing side of the carbon plate for accepting a ceramic sleeve extending through each alignment hole.

11. The apparatus of claim 10, wherein a carbon rod extends through all ceramic sleeves on each opposing side of each carbon plate.

12. The apparatus of claim 10, wherein between each alignment hole a heater element of each carbon plate is shaped in a serpentine shape.

13. The apparatus of claim 11, wherein every subsequent carbon plate transfers electric current to the next carbon plate by a carbon spacer and when the electric current has reached the top most carbon plate, the electric current is passed to a return electrode though one of the carbon rods.

14. The apparatus of claim 11, wherein both carbon rods are threaded at both ends so that a nut may be used to compress the entire stack and ensure good electrical conductance.

15. An apparatus for producing trichlorosilane comprising:
a reactor;
a raw material supply device that supplies metallurgical grade silicon powder as raw material to the reactor;
a gas introduction device that introduces a feed gas, comprising at least a hydrogen gas and STC, to the reactor so that the hydrogen gas and STC reacts with the metallurgical grade silicon powder while the metallurgical grade silicon powder is fluidized by the hydrogen gas and STC;
a heater of stacked heater element carbon plates for heating the feed gas before contact with the metallurgical grade silicon power; and
a gas discharge device that discharges generated gas containing trichlorosilane from the reactor,
wherein the heater element stack is surrounded by graphite.

16. An apparatus for producing trichlorosilane comprising:
a reactor;
a raw material supply device that supplies metallurgical grade silicon powder as raw material to the reactor;
a gas introduction device that introduces a feed gas, comprising at least a hydrogen gas and STC, to the reactor so that the hydrogen gas and STC reacts with the metallurgical grade silicon powder while the metallurgical grade silicon powder is fluidized by the hydrogen gas and STC;
a heater of stacked heater element carbon plates for heating the feed gas before contact with the metallurgical grade silicon power; and
a gas discharge device that discharges generated gas containing trichlorosilane from the reactor,
wherein carbon felt is wrapped around graphite parts.

* * * * *